July 2, 1935. A. P. DIESCHER 2,006,336
TUBE ELONGATING APPARATUS AND METHOD
Filed May 22, 1933 5 Sheets-Sheet 1
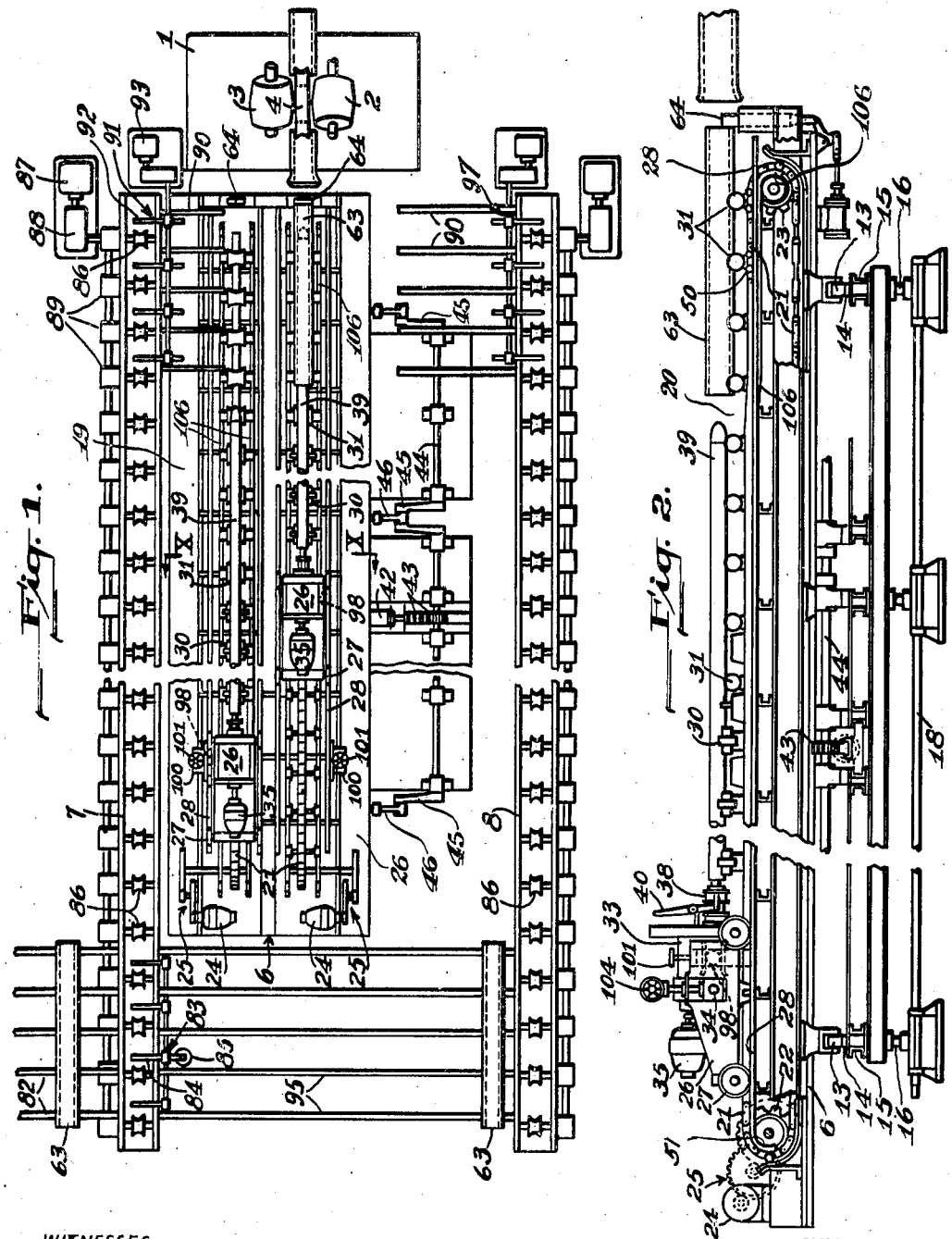
WITNESSES
INVENTOR.
August P. Diescher
BY
Brown, Critchlow & Flick
ATTORNEYS.

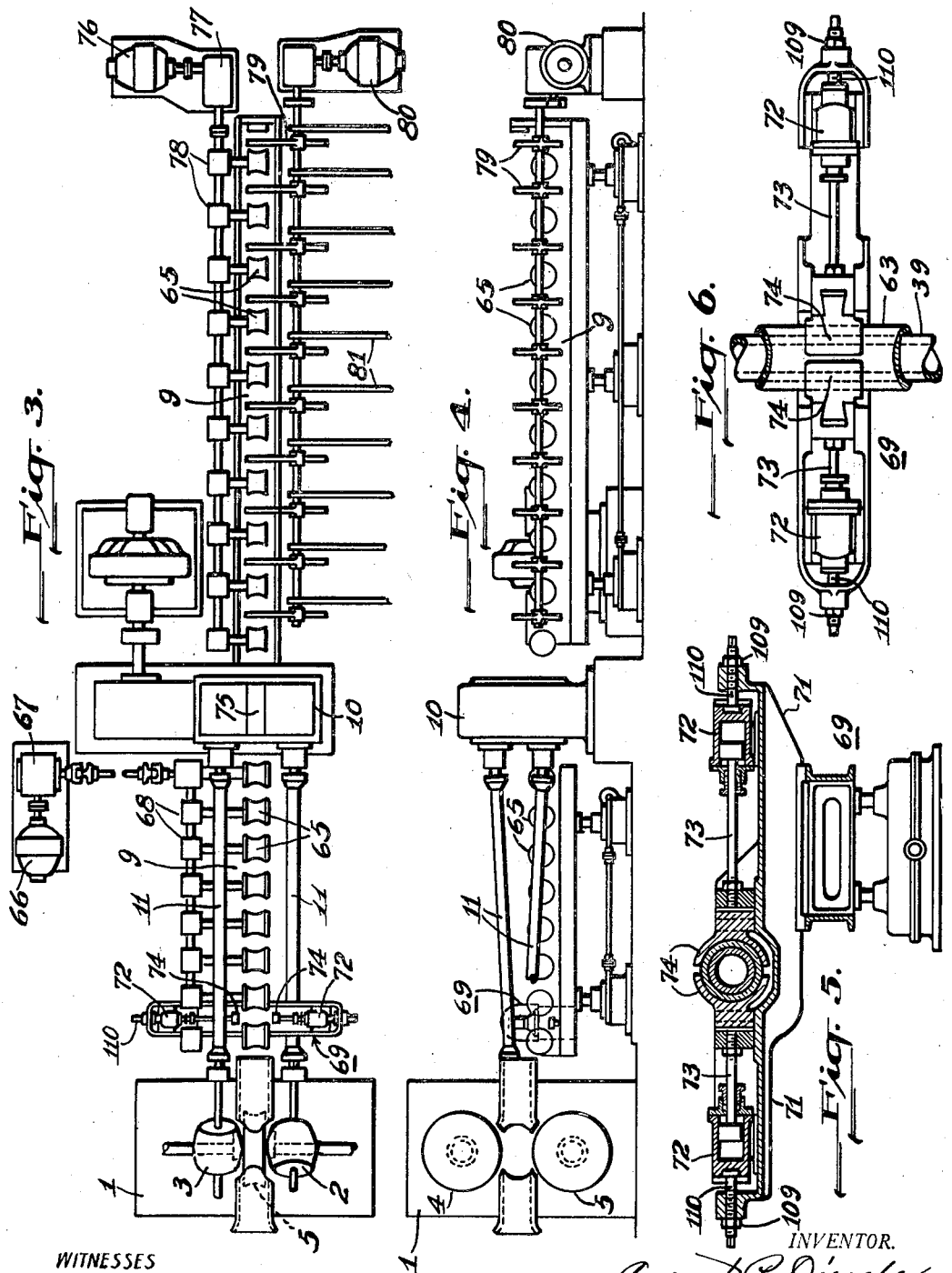

July 2, 1935.   A. P. DIESCHER   2,006,336
TUBE ELONGATING APPARATUS AND METHOD
Filed May 22, 1933   5 Sheets-Sheet 3
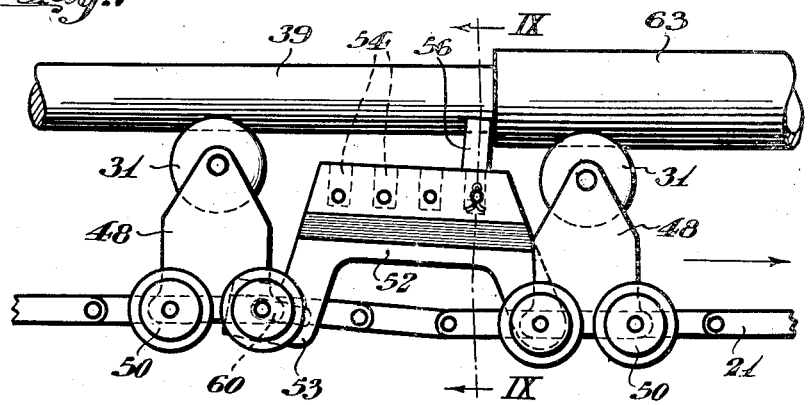
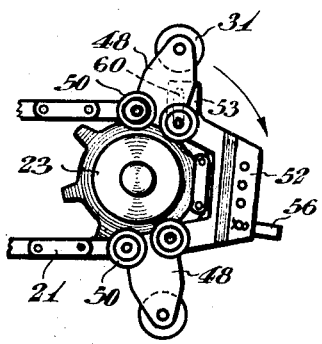
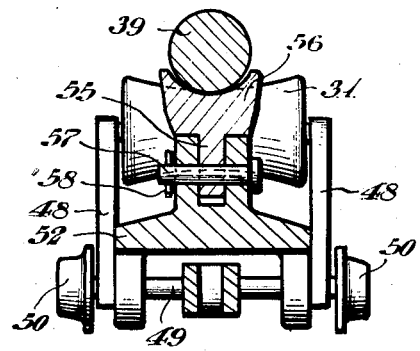
INVENTOR.
August P. Diescher.
BY
Brown, Critchlow & Fick
ATTORNEYS.

July 2, 1935.  A. P. DIESCHER  2,006,336
TUBE ELONGATING APPARATUS AND METHOD
Filed May 22, 1933   5 Sheets-Sheet 4
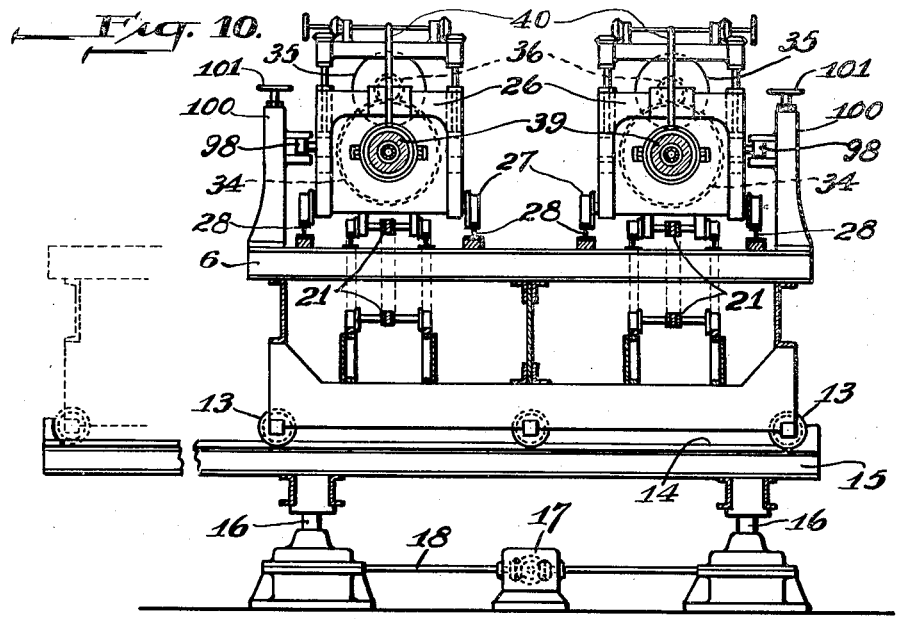
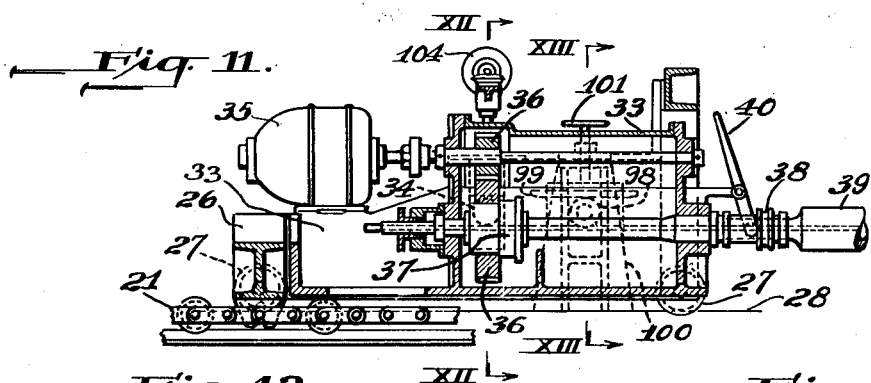
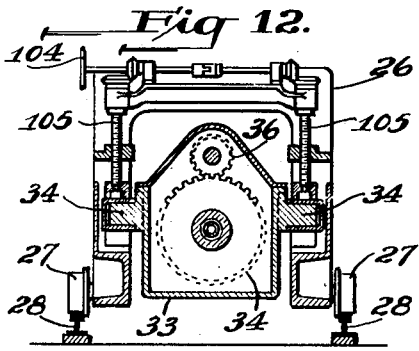 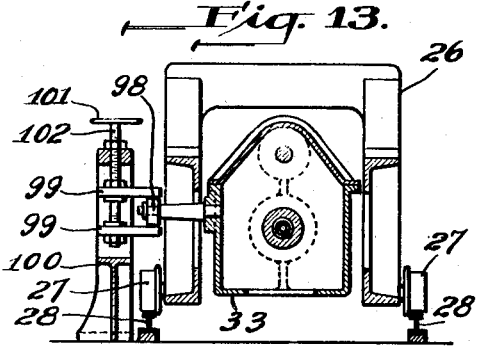
WITNESSES
INVENTOR.
August P. Diescher
BY Brown, Critchlow & Flick
ATTORNEYS.

July 2, 1935.   A. P. DIESCHER   2,006,336
TUBE ELONGATING APPARATUS AND METHOD
Filed May 22, 1933   5 Sheets-Sheet 5
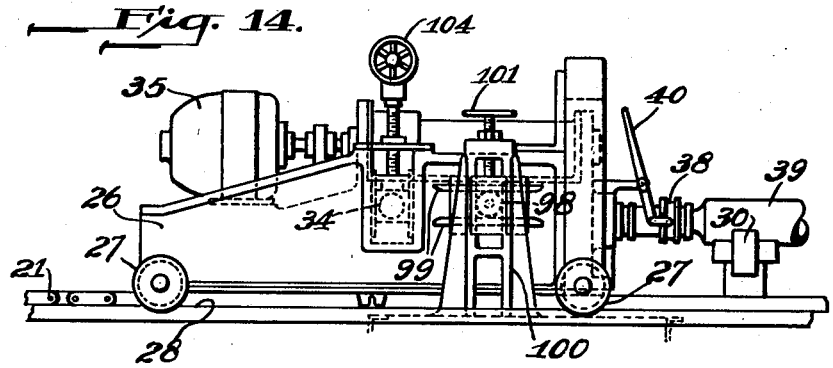
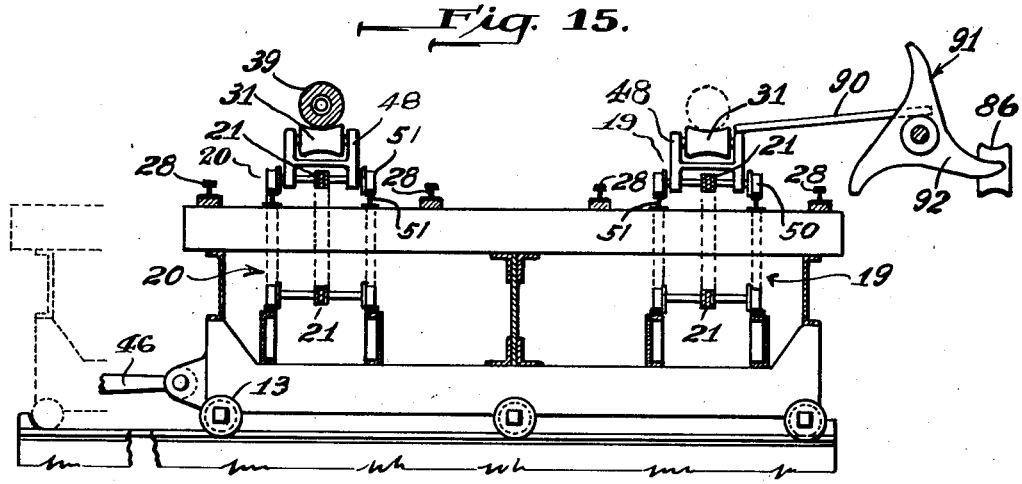
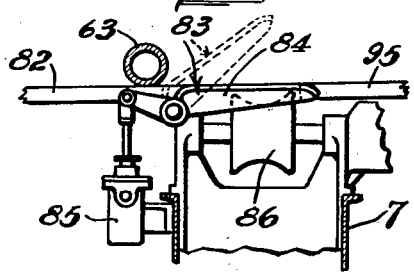
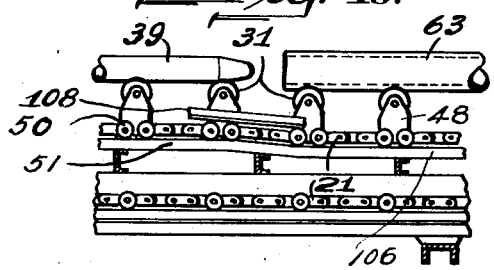
WITNESSES
A. B. Wallace.
J. R. Langley
INVENTOR.
August P. Diescher
BY Brown, Critchlow & Flick
ATTORNEYS.

Patented July 2, 1935

2,006,336

UNITED STATES PATENT OFFICE 2,006,336

TUBE ELONGATING APPARATUS AND METHOD

August P. Diescher, Pittsburgh, Pa., assignor to Diescher Tube Mills, Inc., Pittsburgh, Pa., a corporation of Delaware Application May 22, 1933, Serial No. 672,250

16 Claims. (Cl. 80—13)

My invention relates to the making of tubes, and more particularly to methods and apparatus for cross-rolling tubular blanks on mandrels.

In the operation of cross-rolling tubular blanks on mandrels to reduce wall thickness and elongate, and especially when the tubes are of large diameter, the relatively thin hot walls of the tubes may be damaged by the weight of the mandrels, particularly if the mandrels are permitted to be delivered with the tube from the mill on to a delivery table unsupported otherwise than by the tube. Furthermore, the inertia of the relatively heavy mandrel must be overcome by the mill when the latter engages the tubular blank with the mandrel enclosed therein.

In accordance with the present invention I provide that the mandrel on which tubular blanks are cross-rolled does not pass entirely through the elongator mill to be delivered with the tube on to the delivery table but is retracted through the mill after the cross-rolling operation has been completed; and before the mandrel with the tube thereon enters the cross-rolls it is rotated at a speed which may be slightly less than that which will be imparted to it by the cross-rolls, but which is sufficient substantially to relieve the cross-rolls of the burden of overcoming the inertia of the mandrel. In addition, the rotation of the mandrel may rotate the tubular blank before it enters between the cross-rolls, but regardless of whether the tubular blank is rotated before it enters the mill, the rotating mandrel will aid in overcoming the inertia of the tubular blank since the mandrel will be rotating in the interior of the blank when its exterior is engaged by the cross-rolls.

In order that the mandrel, driven at a lower speed by its driving mechanism, may rotate freely at the speed at which it may be actuated by the cross-rolls, it is driven by mechanism including a one-way clutch which permits the mandrel to rotate faster than it is driven by its driving mechanism.

In order to facilitate the operation of the apparatus for producing seamless tubes, I provide duplicate feed tables for supplying the cross-rolls with tubular blanks and mandrels, which are movable transversely for alignment alternately with the mill. In operation, while the mill is being supplied from one of the feed tables, the other feed table is out of alignment with the mill and is being provided with a tubular blank and the mandrel is partially threaded therethrough. By placing the feed tables in alignment with the mill alternately, the delay in supplying the mill with a succeeding blank after a cross-rolling operation has been completed is greatly reduced.

The mandrel and the tubular blank are fed simultaneously into the cross-rolls by means of a mandrel carriage for rotatably supporting the trailing end of the mandrel and a pusher mechanism movable with the mandrel carriage for engaging the trailing end of the tubular blank. The mandrel carriage is motor driven and its speed is adjustable with respect to the longitudinal movement of the tubular blank through the cross-rolls after the pusher mechanism is disengaged from the tubular blank.

The construction and operation of an approved apparatus embodying the apparatus features and for practicing the method of my invention will be described in connection with the accompanying drawings, in which Fig. 1 is a plan view of feed tables and associated apparatus according to the invention, a cross-roll mill being shown diagrammatically in connection therewith; Fig. 2 is a side elevation of one of the feed tables of Fig. 1 on an enlarged scale, and showing also the table supporting structure; Fig. 3 is an enlarged plan view of the cross-roll mill and the delivery table; Fig. 4 is an enlarged side elevation of the delivery table, a portion of the cross-roll mill being shown diagrammatically; Fig. 5 is a vertical section of the mandrel-stripping mechanism; Fig. 6 is a plan view of the same; Fig. 7 is an enlarged elevation of a portion of a tubular blank and a mandrel therefor and certain associated apparatus; Fig. 8 is an enlarged elevation of a sprocket and certain cooperating apparatus; Fig. 9 is a transverse vertical sectional view taken on line IX—IX of Fig. 7; Fig. 10 is an enlarged vertical section of the feed tables and supporting frame taken on line X—X of Fig. 1, the pushing mechanism for the billets being omitted; Fig. 11 is an enlarged vertical section of a mandrel carriage and certain of its associated parts; Fig. 12 is a transverse vertical section taken on line XII—XII of Fig. 11; Fig. 13 is a similar view taken on line XIII—XIII of Fig. 11; Fig. 14 is an enlarged side elevation of a portion of a mandrel carriage and certain related parts; Fig. 15 is a transverse vertical sectional view of the feed table; Fig. 16 is a side elevation of a portion of a feed table chain, portions of a mandrel and of a tubular blank being supported thereby; and Fig. 17 is an enlarged vertical section illustrating the gate mechanism for controlling the destination of tubular blanks.

Referring to the drawings, the cross-rolling mill 1 may, for example, be an elongating mill such as that shown and described in Patent No. 1,870,209, to S. E. Diescher, granted August 2, 1932. The mill comprises a pair of cross-rolls 2 and 3 the axes of which are inclined to each other and to the pass-line or axis of a tubular blank passing through the mill. The elongator 1 is also provided with vertical discs 4 and 5 that rotate about axes at right angles to the pass-line to engage the blank between the cross-rolls.

The elongator 1 is supplied with tubular blanks to be treated therein by means of feed tables carried by a transversely movable frame 6 having conveying tables 7 and 8 upon opposite sides thereof. The completed tubes are received by a delivery table 9 that is divided in two sections that are separated by a gear stand 10 from which the cross-rolls 2 and 3 are driven by means of spindles 11.

Referring particularly to Figs. 1, 2 and 10, the feed table carrying frame 6 is provided with rollers 13 for operation upon rails 14, whereby the feed tables may be shifted laterally from one operative position to another. The rails 14 are supported upon a framework 15, the elevation of which is regulated by a system of jacks 16 that may be adjusted by power-actuated gear mechanism 17 and shafts 18 connected thereto.

The frame 6 carries duplicate feed tables 19 and 20, each comprising a chain 21 that is mounted on sprockets 22 and 23 at the respective ends of the feed table. The sprocket 22 is adapted to be driven by a motor 24 that is connected thereto by suitable gear mechanism 25.

Each of the feed tables 19 and 20 has a mandrel carriage 26 provided with wheels 27 that roll upon rails 28 on the frame 6, the mandrel carriage being connected to the chain 21 for longitudinal movement therewith. Certain of the links 29 of the chain 21 adjacent the mandrel carriage 26 carry mandrel supporting rollers 30 having axes parallel to the axis of a mandrel supported thereon, and other links carry mandrel and blank supporting rollers 31 that are arranged to rotate about axes at right angles to the axis of the mandrel thereon.

Each mandrel carriage 26 contains therein a movable frame 33, Figs. 11, 12 and 13, mounted for rocking or tilting movement on trunnions 34 in order to maintain its alignment with the mandrel connected thereto. The frame 33 carries a motor 35 the shaft of which is connected by gear mechanism 36, a one-way clutch 37, and a detachable coupling 38 to a hollow mandrel 39 that is preferably water-cooled and that is supported upon the rollers 30 and 31. The coupling 38 is controlled by a manually operable lever 40.

The feed table frame 6 with its duplicate feed tables is moved laterally by means of a fluid pressure cylinder 42, Fig. 1, a rack and pinion mechanism 43, and a shaft 44 having crank arms 45 that are connected to the framework 6 by means of links 46.

As shown in Figs. 2, 7, 8, 15 and 16, the rollers 30 and 31 are supported upon brackets 48 mounted on pairs of horizontal rods 49 having flanged wheels 50 thereon that roll on rails 51. The chain 21 is connected to the rods 49 for actuating the rollers 30 and 31 with the mandrel and with the tubular blank when the mandrel has been inserted therein.

A pusher mechanism for the tubular blank comprises a frame 52 that is connected to adjacent rods 49 between certain pairs of the latter, the frame 52 having slotted foot portions 53 at one end for permitting relative movement between the frame and the rod 49 extending through the slots when the frame 52 passes around the sprocket 23. Three frames 52 are shown by way of examples although any suitable member may be used.

Each frame 52 is provided with a series of vertical openings 54 in the top thereof for receiving the shank 55 of a curved pusher lug 56 for engaging the trailing end of the tubular blank when the mandrel has been threaded therethrough to the desired relative positions before feeding to the cross-rolls. The series of openings 54 provide that the lug 56 may be adjusted for a number of positions in accordance with the length of the mandrel used or in accordance with the length of the portion of the mandrel projecting beyond the forward end of the tubular blank. A pin 57 locks the lug 56 in position and a cotter pin 58 prevents removal of the pin 57.

Each frame 52 is provided with slotted foot portions 53 at one end thereof for permitting relative movement between the frame and the rod 49 extending through the slots 60 in order that the frame 52 may pass around the sprocket 23 and adjust itself to the thereby shortened distance between the rods 49 to which it is connected.

In the operation of the apparatus of my invention, it may be assumed that the feed table frame 6 is in the position illustrated in Fig. 1 with the feed table 20 in alignment with the cross-roll mill 1. It may be assumed also that the aligned feed table 20 has been previously supplied with a tubular blank 63 and that a hollow mandrel 39 has been threaded therethrough to the extent indicated by dotted lines in this view. The chain 21 of the feed table 20 is actuated forwardly to complete the threading of the mandrel 39 through the tubular blank 63 to the desired advanced position before the blank and mandrel enter the cross-rolls of the mill, the blank being held in position by a disappearing limit stop 64 which permits the mandrel to project therethrough. The lug 56 now engages the trailing end of the tubular blank 63.

The disappearing limit stop 64 is then dropped out of the longitudinal path of movement of the tubular blank 63 and the mandrel 39 therein is rotated by the motor 35 through the one-way clutch 37. The speed of rotation of the mandrel is preferably slightly less than that at which it will be driven by the cross-rolls when the tubular blank is engaged thereby. The motor 24 now drives the chain 21 forwardly and the blank and the mandrel are actuated into the mill by the lug 56 and mandrel carriage 26, respectively.

When the tubular blank is engaged by the cross-rolls of the mill the mandrel may rotate at the speed at which it is actuated by the mill, as is permitted by the one-way clutch, and the motor 35 may be stopped. The initial rotation of the mandrel may or may not rotate the tubular blank thereon before the latter is engaged by the cross-rolls, but the initial rotation of the mandrel within the blank assists in overcoming the inertia of the blank. This effect is the opposite of that of prior practice in which a relatively heavy mandrel has initially retarded the rotation of the tubular blank at the speed of the cross-rolls.

When the tubular blank 63 and the mandrel 39 enter the mill the frame 52 carrying the block 56 is near the sprocket 23 and the lug 56 is disengaged from the tubular blank 63 after a short travel as the forward end of the frame 52 drops in its course around the sprocket 23. As soon as this disengagement occurs, the tubular blank is actuated by the cross-rolls and the mandrel by the chain 21. The rates of advance of the tubular blank and the mandrel may differ somewhat for reasons stated below. The relative positions of a frame 52 and the sprocket 23 when the chain 21 is at an intermediate portion of its travel are shown in Fig. 8. It will be noted that the slots 60 permit the frame and the rods 49 to assume their respective positions relative to the sprocket 23.

The rate of advance of the mandrel between the cross-rolls during the cross-rolling operation may be regulated by the speed of the chain 21 to which the mandrel carriage 26 is connected. Ordinarily the rate of advance of the mandrel is a compromise between that of the portion of completed tube and the portion of the tubular blank that has not yet entered the cross-rolls. If the rate of advance of the mandrel under control of the chain 21 is faster than that normally caused by the operation of the cross-rolls, it will assist the progress of the tubular blank through the mill, thereby increasing the rate of production of the mill. If, however, the speed of the chain is such that the mandrel advances more slowly than its normal rate, a shorter mandrel may be used, since the tube will be complete before the mandrel has advanced to the position it would occupy if it were not retarded.

When the tube is completed, the chain 21 is stopped and the tube upon the mandrel occupies a position on rollers 65 of the delivery table 9 which are adapted to be driven by means of a motor 66 and gear mechanisms 67 and 68 connected thereto. A portion of the mandrel projects on the delivery side of the mill. In order to retract the mandrel 39 through the cross-rolls it is usually necessary to employ mechanical means for preventing the return movement of the completed tube, and a convenient mechanism for this purpose is illustrated in Figs. 5 and 6.

The mandrel-stripping mechanism 69 provided for this purpose comprises horizontal arms 71 which support fluid pressure cylinders 72 that operate piston rods 73 to cause oppositely disposed curved gripping jaws 74 to clamp the completed tube upon opposite sides thereof, whereupon the chain 21 may be actuated in the opposite direction to return the mandrel carriage 26 and the mandrel 39 connected thereto to their inoperative positions which correspond to the positions occupied by the carriage 26 and mandrel 39 of the feed mechanism 19, Fig. 1, which is not in alignment with the mill 1.

The completed tube is then released by the mandrel-stripping mechanism 69 and is conveyed by the rollers 65 through a suitable passageway 75 in the gear stand 10 to similar rollers 65 of a second section of the delivery table, these rollers being actuated by a motor 76 and gear mechanisms 77 and 78 connected thereto. The completed tube is then transferred from the delivery table 9 by means of a "throw-out" mechanism 79 driven by a motor 80, and which transfers the tube to skids 81 whereby it may be transferred to any suitable location for cooling, or storage, or further processing.

In the meantime, while the feed tables are in their illustrated position and a tubular blank is being supplied by the feed table 20 to the cross-roll mill 1 in the manner described above, the feed table 19 is being supplied with a tubular blank for the succeeding operation. A tubular blank 63, which may be supplied from a furnace or other suitable means for heating blanks, is illustrated as moving upon skids 82 toward the conveying table 7. A gate 83, certain of the details of which are shown in Fig. 17, comprises arms 84 that are raised by a fluid pressure cylinder 85 to their uppermost positions, as indicated by dotted lines, Fig. 17, in which case the tubular blank 63 will drop into the grooves of rollers 86 of the conveying table 7 which are driven by means of a motor 87 and gear mechanisms 88 and 89 connected thereto.

When the tubular blank reaches the forward end of the conveying table 7, it is transferred from the rollers 86 to skids 90 by means of a transfer or "throw-out" mechanism 91 similar to "throw-out" mechanism 79 and comprising a series of rotatable triangular members 92, one of which is shown in Fig. 15. The "throw-out" mechanism 91 is actuated by a motor 93. The tubular blank 91 is deposited by the skids 90 upon rollers 31 of the chain 21 of the feed table 19, which is thus supplied with a blank.

The chain 21 of the feed table 19 with a tubular blank thereon is then actuated to advance its mandrel carriage 26 and the mandrel 39 carried thereby to thread the mandrel into the tubular blank to substantially the relative position corresponding to that occupied by the tubular blank 63 and mandrel 39 of the feed table 20, as illustrated in Fig. 1. The tubular blank is prevented from moving forwardly by the disappearing limit stop 64. The mandrel is left in this intermediate position in order that it may not interfere with the lateral movement of the carrying frame 6 which must occur in order to place the feed table 19 in alignment with the mill.

The frame 6 is then shifted laterally by means of the fluid pressure cylinder 42 and rack and pinion mechanism 43 and associated mechanism until the feed table 19, which has just been supplied with a tubular blank, is in alignment with the mill and the feed table 20 which has last supplied the mill is in a position adjacent the conveying table 8 that corresponds to that in which the feed table 19 is illustrated with respect to the conveying table 7.

The operation of supplying the feed table 20 with a tubular blank by means of the conveying table 8 corresponds in every respect to that described for the conveying table 7 except that the gate 83 will be actuated to its lowermost position in which the arms 84 bridge the gaps between the skids 82 and skids 95, extending over the rollers 86 of the table 7. The skids 95 convey the tubular blank to the rollers 86 of the conveying table 8. The blank is transferred from the forward end of table 8 by a "throw-out" mechanism 97 to skids 90 which conduct it to rollers 31 of the feed table 20.

The cycle of operations that has previously been described is then repeated. The alternation of the feed tables in one or the other of their positions is continued throughout the operation of the apparatus, the feed table that is not supplying the mill being provided with a tubular blank in readiness for the succeeding elongating operation and the mandrel being placed in position therein.

In case a mandrel becomes so highly heated as to require cooling before further use, it may be detached for replacement by a cooler mandrel while its carriage is at its extreme position to the left by the operation of the detachable coupling by means of the lever 40. The frame 33 of the mandrel carriage will be retained in substantially the vertical position it occupies when a mandrel is connected thereto by means of a wheel 98 carried by the frame and which, when the carriage 26 is in its rearmost position, occupies a position between two horizontal guide plates 99 secured to a stationary post 100. The vertical positions of the guide plates 99 are adjusted by means of a hand wheel 101 and a screw-threaded shaft 102.

The vertical positions of the trunnions 34 are also adjustable by means of a hand wheel 104 on a shaft that is geared to screw-threaded shafts 105 which carry the bearings for the trunnions. Proper vertical adjustment to insure alignment of the mandrel may be secured by this means.

By reference to Figs. 2 and 16 it will be noted that the forward portions 106 of the rails 51 for supporting the rollers 50 of each chain 21 are at a lower level than the remaining portions, and that the difference in levels is sufficient to compensate for the difference in diameters of the mandrels and tubular blanks 63 in order that the mandrels may be easily and conveniently threaded through the tubular blanks when the mandrel carriages and mandrels are actuated forwardly. It will be understood also that the difference in track level enables the rollers 31 to support either the mandrel or the tubular blank, as the case may be.

A guard rail 108, Fig. 16, positively retains the wheels 50 on the inclined portion 106 of the rails 51. The forward ends of the rail portions 106 are bent to extend concentrically with the sprocket 23. The other ends of the rails 51 are similarly curved around the axis of the sprocket 22.

The provision of the mandrel supporting rollers 30 on each of the chains 21 enables the trailing end of the mandrel to be partially supported for rotation thereon after it has been actuated forwardly until the supporting rollers 31 have passed down the inclined portion of the rails 51 and out of engagement therewith. The rollers 31 have axes at right angles to rollers 30 whereby they readily pass under the stationary tubular blank.

While the operation of the mandrel-stripping mechanism has been described as including the gripping or clamping of the completed tube, the tube clamping jaws of the mechanism may also serve as an abutment for the tube while the mandrel is withdrawn. In such case, the jaws 74 are closed loosely around the mandrel at the trailing end of the tube to prevent the return of the tube while permitting the mandrel to move freely.

The mandrel-stripping mechanism 69 may be adjusted for tubes of different diameters by suitably shifting the positions of the cylinders 72 toward or away from the outer ends of the arms 71. Such adjustment is made by loosening a nut 109 on a screw-threaded shaft 110 and rotating the latter by means of its square outer end.

The apparatus of my invention possesses a number of advantages that will be appreciated by those skilled in the art of construction and operation of cross-rolling apparatus, such, for example, as the provision of duplicate feed tables and associated apparatus whereby upon the completion of an elongating operation another mandrel and tubular blank may be substantially in readiness for the succeeding operation. Alternate operation also permits the mandrels to cool or to be cooled by applying water during the intervals between operations, whereby they may remain in service throughout relatively long periods.

The relatively heavy mandrel is positively rotated before it enters the cross-rolls of the mill, and it is not necessary for the latter to overcome the inertia of the mandrels. Furthermore, the rotation of the mandrel within the tubular blank assists the mill in overcoming the inertia of the tubular blank whether or not the latter is actually rotated by the mandrel. The provision of the one-way clutch connection between the motor and the mandrel driven thereby permits the latter to rotate faster than the speed of the motor, whereby the progress of the mill is not retarded.

The rate of advance of the mandrel into the cross-roll mill may be regulated as desired, whereby the mandrel may expedite the passage of the tubular blank through the mill or, if it is so desired, the rate of advance of the mandrel may be slower than that at which it is normally actuated by the mill, in which case a shorter mandrel may be employed.

I claim:

1. A feed table for cross-rolling mills, comprising mechanisms for advancing a mandrel and a tubular blank thereon into the mill, and means connected to the mandrel for positively rotating it until the tubular blank is engaged by the mill and for permitting said mandrel when rotated by the mill and while connected to said rotating means to rotate at a speed greater than the speed of the rotating means.

2. The combination with a cross-rolling mill, of means for supplying tubular blanks to the mill comprising two parallel feed tables from which tubular blanks are fed longitudinally into the mill, means for moving said feed tables transversely to position them alternately in alignment with the mill, and means for supplying a tubular blank to each of said feed tables while it is out of alignment with said cross-rolls.

3. The combination with a cross-rolling mill, of means for supplying tubular blanks to the mill comprising a transversely shiftable support, two parallel feed tables carried by said support, means for moving said support to position said feed tables alternately in alignment with the mill, means for supplying tubular blanks to said feed tables alternately when in position out of alignment with the mill, and means for advancing the tubular blanks from the aligned table into the mill.

4. The combination with a cross-rolling mill, of means for supplying tubular blanks to the mill comprising a transversely shiftable support, two parallel feed tables carried by said support, two conveying tables for tubular blanks one on each side of said support, means for moving said support to position said feed tables alternately in alignment with the mill, means for transferring tubular blanks alternately from said conveying tables to the feed table which is in position out of alignment with the mill, and means associated with each feed table for advancing a tubular blank from the table into the mill.

5. The combination with a cross-rolling mill, of means for supplying tubular blanks with a contained mandrel to the mill comprising two parallel feed tables, means for moving said feed tables transversely to position them alternately in alignment with the mill, means for supplying tubular blanks to the feed tables alternately when in position out of alignment with the mill, a mandrel carriage associated with each feed table, and means for moving the mandrel carriage to advance a mandrel into the blank positioned on the table and for advancing the blank and mandrel into the mill.

6. The combination with a cross-rolling mill, of means for supplying tubular blanks with a contained mandrel to the mill comprising a transversely shiftable support, two parallel feed tables carried by said support, means for moving said support to position said feed tables alternately in alignment with the mill, means for supplying tubular blanks to the feed tables alternately when in position out of alignment with the mill, a mandrel carriage associated with each feed table, and means for moving the mandrel carriage of each feed table to advance a mandrel into the blank positioned on the table while the table is out of alignment with the mill and for advancing the blank and mandrel into the mill when the table has been positioned in alignment with the mill.

7. The combination with a cross-rolling mill, of means for supplying tubular blanks with a contained mandrel to the mill comprising two parallel feed tables, means for moving said feed tables transversely to position them alternately in alignment with the mill, means for supplying tubular blanks to the feed tables alternately when in position out of alignment with the mill, and a mandrel on each feed table, each feed table being provided with means for advancing its mandrel into a blank positioned on the table and for advancing the blank and the mandrel into the mill and for retracting the mandrel through the mill after the blank has passed therethrough.

8. The combination with a cross-rolling mill, of means for supplying tubular blanks to the mill comprising mechanism for advancing a mandrel and a tubular blank thereon longitudinally into the mill and including means connected to the mandrel for positively rotating it while it is being thus advanced, said mechanism comprising means for permitting the mandrel to rotate faster than the driving means therefor.

9. The combination with a cross-rolling mill, of means for supplying tubular blanks to the mill comprising a feed table having means movable longitudinally thereof to advance a mandrel and a tubular blank thereon into the mill, and having a motor and a one-way driving connection to the mandrel for rotating the latter prior to its entering the mill.

10. A feed table for cross-rolling mills, comprising reciprocable means for supporting a mandrel and a tubular blank and for advancing them into the mill, and a motor connected through a one-way clutch to the mandrel for rotating the latter prior to its entering the mill, said means being operable also to retract the mandrel through the mill after the tubular blank has passed therethrough.

11. A feed table for cross-rolling mills, comprising a reciprocable chain having connected thereto means for supporting a mandrel and a tubular blank, and a mandrel carriage connected to move with said chain and comprising a motor and a one-way clutch for rotating the mandrel before it enters the mill, said clutch permitting said mandrel to be rotated by the mill faster than it is driven by said motor.

12. A feed table for cross-rolling mills comprising a mandrel carriage having a tiltable frame for adjusting its position to conform to that of a mandrel connected thereto when the carriage is in an operative position, and means for preventing tilting movement of said frame when the carriage is in an inoperative position.

13. A feed table for cross-rolling mills comprising a movable mandrel carriage having a frame for connection to a mandrel, said frame being tiltable about a horizontal axis to adjust its position to conform with that of said mandrel, and stationary means for restraining said frame from tilting movement when the carriage is in a retracted position relative to an associated co-operating cross-rolling mill.

14. A feed table for cross-rolling mills comprising a movable mandrel carriage having a frame for connection to a mandrel, said frame being tiltable about a horizontal axis to adjust its position to conform with that of said mandrel, means for adjusting the vertical position of said frame relative to said carriage, and means adjacent the path of movement of said carriage for preventing tilting movement of said frame when the carriage occupies a certain position.

15. Apparatus for treating a tubular blank on a mandrel, comprising helically acting cross-rolls whereby the blank and contained mandrel are rotated and advanced longitudinally, and means connected to the mandrel for applying force to the mandrel acting in the direction of its longitudinal movement with the blank to cause it to advance at a rate in excess of its normal rate of advance with the blank under the action of the cross-rolls, and thereby increasing the rate of advance of the blank.

16. The method of treating tubular blanks, which comprises cross-rolling the blank on a mandrel between helically acting cross-rolls whereby the blank and contained mandrel are rotated and advanced longitudinally, and applying force directly to the mandrel in the direction of its longitudinal advance with the blank to cause is to advance at a rate in excess of its normal rate of advance with the blank under the action of the cross-rolls, and thereby increasing the rate of advance of the blank.

AUGUST P. DIESCHER.